US008561117B2

(12) United States Patent
Rouhana, Jr.

(10) Patent No.: US 8,561,117 B2
(45) Date of Patent: Oct. 15, 2013

(54) SYSTEM FOR SIMULTANEOUS DELIVERY OF DIGITAL TELEVISION AND INTERACTIVE BROADBAND SERVICE

(75) Inventor: William J. Rouhana, Jr., Greenwich, CT (US)

(73) Assignee: RTEM Innovations Corp., Greenwich, CT (US)

( * ) Notice: Subject to any disclaimer, the term of this patent is extended or adjusted under 35 U.S.C. 154(b) by 751 days.

(21) Appl. No.: 12/655,140

(22) Filed: Dec. 22, 2009

(65) Prior Publication Data

US 2010/0107210 A1 Apr. 29, 2010

Related U.S. Application Data

(62) Division of application No. 11/713,383, filed on Mar. 2, 2007.

(60) Provisional application No. 60/779,761, filed on Mar. 6, 2006, provisional application No. 60/779,693, filed on Mar. 6, 2006, provisional application No. 60/779,957, filed on Mar. 6, 2006, provisional application No. 60/779,509, filed on Mar. 6, 2006, provisional application No. 60/779,560, filed on Mar. 6, 2006, provisional application No. 60/779,562, filed on Mar. 6, 2006, provisional application No. 60/779,839, filed on Mar. 6, 2006, provisional application No. 60/779,508, filed on Mar. 6, 2006, provisional application No. 60/779,564, filed on Mar. 6, 2006, provisional application No. 60/779,563, filed on Mar. 6, 2006, provisional application No. 60/779,757, filed on Mar. 6, 2006, provisional application No. 60/779,561, filed on Mar. 6, 2006, provisional application No. 60/779,887, filed on Mar. 6, 2006, provisional application No. 60/788,212, filed on Mar. 31, 2006, provisional application No. 60/788,210, filed on Mar. 31, 2006.

(51) Int. Cl.
*H04N 7/173* (2011.01)

(52) U.S. Cl.
USPC ............................. 725/99; 725/118; 725/125

(58) Field of Classification Search
USPC .......................................... 725/126, 118, 99
See application file for complete search history.

(56) References Cited

U.S. PATENT DOCUMENTS

| | | | | |
|---|---|---|---|---|
| 7,177,632 | B1 * | 2/2007 | Ringen et al. | 455/418 |
| 2002/0003808 | A1 * | 1/2002 | Marin et al. | 370/465 |
| 2002/0037716 | A1 * | 3/2002 | McKenna et al. | 455/422 |
| 2003/0231206 | A1 * | 12/2003 | Armstrong | 345/744 |
| 2004/0010653 | A1 * | 1/2004 | Grundy et al. | 710/315 |
| 2005/0026629 | A1 * | 2/2005 | Contractor | 455/456.1 |

* cited by examiner

*Primary Examiner* — Hunter B Lonsberry
(74) *Attorney, Agent, or Firm* — Epstein Drangel LLP; Robert L. Epstein

(57) ABSTRACT

A method and apparatus is provided for the delivery of digital television and interactive broadband service in a manner that maximizes the usage of the digital broadcast spectrum. A digital television signal is transmitted to a given broadcast area in a relatively small part (for example, a 1 MHz band) of one or more licensed portions of the digital broadcast spectrum. Interactive broadband service is delivered within at least a portion of the same broadcast area covered by the broadcast digital television signal, in the remainder (for example, a 5 MHz band) of an unused part of the same licensed portion of the digital broadcast spectrum as is occupied by the digital television signal, or within an unlicensed (unused) portion of the digital broadcast spectrum. The broadcasting of the digital television and delivery the interactive broadband service occur simultaneously. In one embodiment, digital television and broadband service are delivered by the same equipment within the same bandwidth.

8 Claims, 4 Drawing Sheets

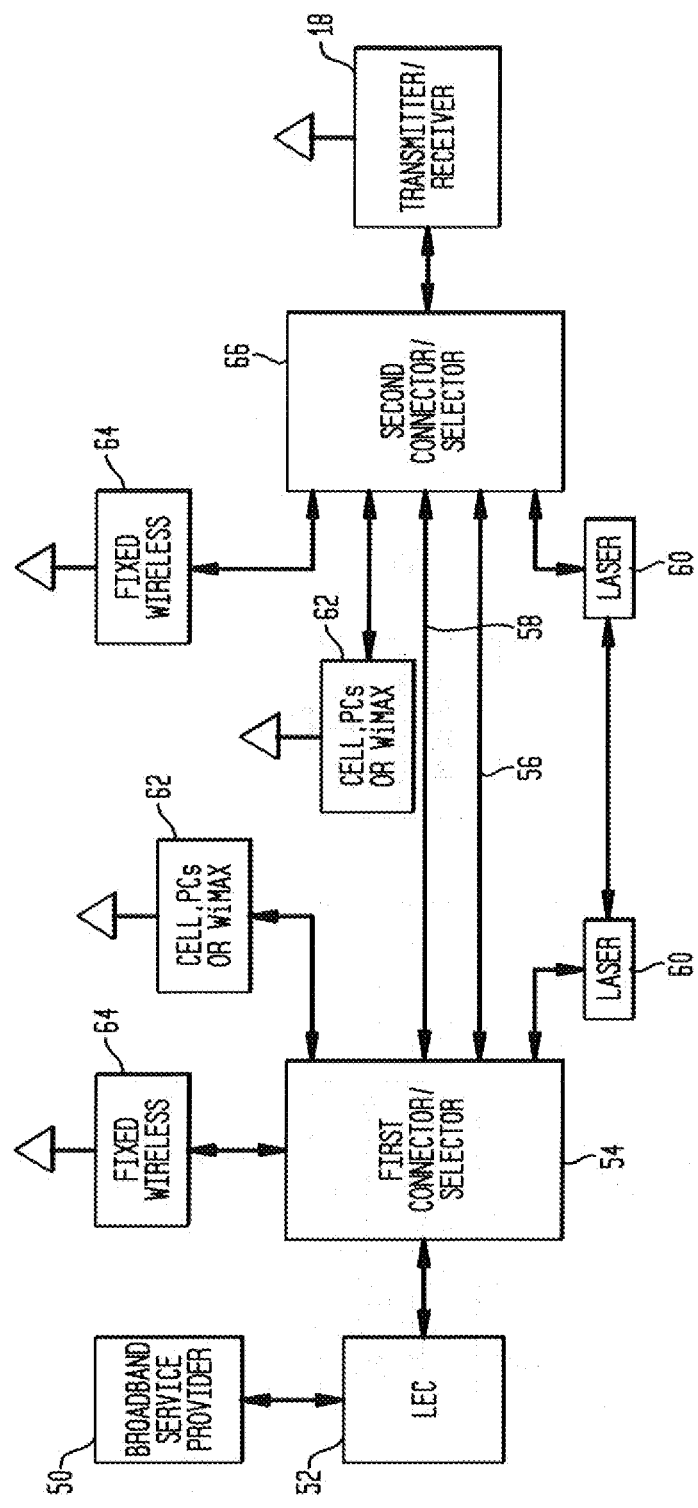

SYSTEM FOR SIMULTANEOUS DELIVERY OF DIGITAL TELEVISION AND INTERACTIVE BROADBAND SERVICE

CROSS-REFERENCE TO RELATED APPLICATIONS

Applicant claims priority on the following provisional patent applications:

| Title | Ser. No. | Filing Date |
|---|---|---|
| System For Simultaneously Delivering Digital Transmission And Interactive Communications Services | 60/779,761 | Mar. 6, 2006 |
| Low Power System For Simultaneously Delivering Digital Transmission And Interactive Communications Services | 60/779,693 | Mar. 6, 2006 |
| High Power System For Simultaneously Delivering Digital Transmission And Interactive Communications Services | 60/779,957 | Mar. 6, 2006 |
| Cellular System For Simultaneously Delivering Digital Transmission And Interactive Communications Services | 60/779,509 | Mar. 6, 2006 |
| System For Simultaneously Delivering Digital Transmission And Interactive Communications Services Utilizing Reflectors To Maximize Signal Strength | 60/779,560 | Mar. 6, 2006 |
| Method And Apparatus For Eliminating Interference In System For Simultaneously Delivering Digital Transmission And Interactive Communications Services | 60/779,562 | Mar. 6, 2006 |
| System For Simultaneously Delivering Digital Transmission And Interactive Communications Services | 60/779,839 | Mar. 6, 2006 |
| Low Power System For Simultaneously Delivering Digital Transmission And Interactive Communications Services | 60/779,508 | Mar. 6, 2006 |
| High Power System For Simultaneously Delivering Digital Transmission And Interactive Communications Services | 60/779,564 | Mar. 6, 2006 |
| Cellular System For Simultaneously Delivering Digital Transmission And Interactive Communications Services | 60/779,563 | Mar. 6, 2006 |
| System For Simultaneously Delivering Digital Transmission And Interactive Communications Services Utilizing Reflectors To Maximize Signal Strength | 60/779,757 | Mar. 6, 2006 |
| Method And Apparatus For Eliminating Interference In System For Simultaneously Delivering Digital Transmission And Interactive Communications Services | 60/779,561 | Mar. 6, 2006 |
| System For Simultaneously Delivering Digital And Interactive Communications Services Utilizing Reflectors To Maximize Signal Strength | 60/779,887 | Mar. 6, 2006 |
| Advertising Revenue Supported System For Voice Data And Video Interactive Communications Services | 60/788,212 | Mar. 31, 2006 |
| System For Utilizing Paging Spectrum To Provide Network Management | 60/788,210 | Mar. 31, 2006 |

This application is a divisional of U.S. patent application Ser. No. 11/713,383 filed Mar. 2, 2007 in the name of William J. Rouhana Jr. entitled: "System for Simultaneous Delivery of Digital Television and Interactive Broadband Service".

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to a method and apparatus for the transmission of digital television and for the delivery of interactive broadband service and more particularly for the simultaneous delivery of digital television and interactive broadband service in a manner that maximizes digital broadcast spectrum usage.

2. Description of Prior Art Including Information Disclosed Under 37 CFR 1.97 and 1.98

The U.S. Congress has set a Feb. 18, 2009 deadline for television stations to switch entirely from analog to digital broadcasts. All such digital television broadcasts must utilize the digital broadcast spectrum located at 480-698 MHz. This switch will allow broadcasters to deliver a single channel of television programming utilizing only a small part, for example, 1 MHz of the 6 MHz, of bandwidth that each broadcast license allocates to each television station owner. One embodiment of the present invention is directed to a system for using the remaining part, for example, 5 MHz of the 6 MHz, of the bandwidth allotted to each license holder to deliver interactive broadband service at the same time that digital television signal is broadcast within the licensed bandwidth. A second embodiment of the present invention is directed to a system for using the bandwidth between the 6 MHz bands allotted to license holders to deliver interactive broadband service at the same time that the digital television signal is broadcast within the licensed bandwidth. A third embodiment of the present invention is directed to a system where the digital television signal and the interactive broadband service are delivered in an integrated fashion within the same bandwidth, either licensed or unlicensed, utilizing Internet protocol.

Spectrum is an extremely valuable and scarce resource. Maximizing the use of spectrum for its best and highest use is a critical financial and public policy goal. In August 2006, the FCC conducted the Advanced Wireless Services (AWS) auction in which other spectrum, which can be used in similar ways but which is less valuable then digital broadcast spectrum, was sold to telecommunications, satellite and cable service providers. In that auction, various companies in the wireless industry paid approximately $14 billion for 90 MHz of AWS Spectrum. There are 200 MHz of digital broadcast spectrum.

In another comparable spectrum development, specifically in the 700 MHz frequency, on Feb. 1, 2005, Aloha Partners LP announced that it purchased Cavalier Group LLC and Data-Com Wireless LLC, respectively the second and third largest owners of 700 MHz spectrum in the United States. Though the purchase price comparables were not disclosed publicly, those purchases indicate additional interest in the ownership of spectrum assets.

Demand for broadband services is exploding. Over the last several years, various devices including computers, PDA's, cellular telephones and other similar devices have been connected to the world wide web (the Internet) for a variety of services that are of increasing importance in delivery to both commerce and consumer entertainment. The ability to deliver these services on a mobile or portable basis is increasingly viewed as an essential element of the telecommunications and entertainment industries. Mobile or portable delivery requires the use of wireless technologies which, in turn, requires the use of spectrum. As a result, the demand for spectrum is expected to continue to skyrocket and spectrum costs are expected to continue to increase.

Recently, the Federal Communications Commission has begun a proceeding to determine how to use the unlicensed portions of the digital broadcast spectrum. This proceeding seeks to set regulations for the use of the "white space" (unlicensed spectrum) in the digital television band.

By utilizing the system of the present invention, a digital broadcast spectrum owner, or a user of the digital broadcast white space, or both can utilize digital television spectrum to most efficiently and effectively deliver both television and broadband service to end users.

Thus, the present invention is directed to a method and apparatus for the delivery of interactive broadband service and, more particularly, to the delivery of that service utilizing the digital broadcast spectrum, currently located at 480-698 MHz, while simultaneously delivering television using that spectrum.

Interactive broadband service may be delivered by WiMax (World Interoperability for Microwave Access) based upon the IEEE 802.16 standard. WiMax enables broadband speeds over wireless networks at a cost which permits mass market. Currently, there are two main WiMax applications: fixed WiMax applications are point-to-multipoint enabling broadband access to homes and businesses, and mobile WiMax which offers the full mobility of cellular networks at broadband speeds. The present invention is capable of both fixed and mobile WiMax applications.

Alternatively, delivery of the interactive broadband service in accordance with the present invention may utilize any of the following technologies: 3G, EV-DO or HSPDA.

In the following specification, the term "digital broadcast spectrum" is used to refer any portion of the broadcast spectrum that may be used to broadcast digital signals. Thus, although examples provided to understand the invention relate to the 480-698 MHz frequency band currently used to for television signals, that term is to be understood to include, in addition to the 480-698 MHz frequency band presently allotted to television signals, the spectra which are currently or in the future may be allotted to television, cellular, PCS, AWS and other similar services.

Further, the reference to "licensed" and "unlicensed" portions of the digital broadcast spectrum should be not be considered to be limited to the current licensing scheme and may best be understood as generally referring to used and unused portions of the digital broadcast spectrum.

BRIEF SUMMARY OF THE INVENTION

It is, therefore, a prime object of the present invention to provide a system for the simultaneous delivery of digital television and interactive broadband service.

It is another object of the present invention to provide a system for the simultaneous delivery of digital television and interactive broadband service utilizing the same licensed band of the digital broadcast spectrum.

It is another object of the present invention to provide a system for the simultaneous delivery of digital television and interactive broadband service utilizing one or more licensed bands of the digital broadcast spectrum and the "white space" outside of or between licensed bands.

It is another object of the present invention to provide a system for the simultaneous delivery of digital television and interactive broadband service utilizing the unused bandwidth that each broadcast license allocates to each television station owner.

It is another object of the present invention to provide a system for the simultaneous delivery of digital television and interactive broadband service utilizing a digital television signal transmitter and a WiMax transmitter/receiver, both transmitting on frequencies within the same 6 MHz portion of the digital broadcast spectrum.

It is another object of the present invention to provide a system for the simultaneous delivery of digital television and interactive broadband services utilizing a digital television signal transmitter and a WiMax transmitter/receiver, both transmitting on frequencies within the same 6 MHz portion of the digital broadcast spectrum, wherein the WiMax transmitter/receiver covers at least a portion of the broadcast area of the digital television transmitter.

It is another object of the present invention to provide a system for the simultaneous delivery of digital television and interactive broadband service utilizing a digital television signal transmitter and a WiMax transmitter/receiver, both transmitting on frequencies within the same 6 MHz portion of the digital broadcast spectrum, wherein network management signals are delivered outside that portion of the spectrum to provide cost effective network management, in lieu of using a portion of any spectrum being used to deliver the broadband services, thereby maximizing the use of the spectrum used to deliver such services to end users.

It is another object of the present invention to provide a system for the simultaneous delivery of digital television and interactive broadband service utilizing a digital television signal transmitter and a WiMax software defined transmitter/receiver connected to a network management signal transmitter/receiver, wherein the WiMax transmitter/receiver and network management signal transmitter/receiver cover at least a section of the broadcast area of the digital television signal transmitter.

It is another object of the present invention to provide a system for the simultaneous delivery of digital television and interactive broadband services utilizing a digital television signal transmitter and a plurality of WiMax transmitters/receivers, each connected to a network management signal transmitter/receiver, wherein the WiMax transmitter/receivers and the network management signal transmitter/receivers cover at least a portion of the broadcast area of the digital television transmitter.

It is another object of the present invention to provide a system for the simultaneous delivery of digital television and interactive broadband service utilizing a digital television signal transmitter and multiple WiMax transmitters/receivers, all transmitting on the same 6 MHz portion of the digital broadcast spectrum.

It is another object of the present invention to provide a system for the simultaneous delivery of digital television and interactive broadband service utilizing a digital television signal transmitter and a WiMax transmitter/receiver, both transmitting on the same 6 MHz portion of the digital broadcast spectrum, wherein the digital television signal transmitter transmits on a part of that portion of the digital broadcast spectrum and the WiMax transmitter/receiver transmits on all or part of the remaining part of that portion of the digital broadcast spectrum.

It is another object of the present invention to provide a system for the simultaneous delivery of digital television and interactive broadband service utilizing a digital television signal transmitter and a plurality of WiMax transmitters/receivers, all transmitting on the same 6 MHz portion of the digital broadcast spectrum, wherein the digital television signal transmitter transmits on 1 MHz of that portion of the digital broadcast spectrum and the WiMax transmitter/receivers transmit on all or part of the remaining 5 MHz of that portion of the digital broadcast spectrum.

It is another object of the present invention to provide a system for the simultaneous delivery of digital television and interactive broadband service utilizing the same digital broadcast spectrum, wherein the interactive broadband service is delivered to broadband communication devices having interference detection technology.

It is another object of the present invention to provide a system for the simultaneous delivery of digital television and interactive broadband services utilizing the same digital broadcast spectrum, wherein the interactive broadband services are delivered by a WiMax transmitter/receiver to broadband communications devices including computers, wherein the computers utilize a lower return signal bit rate than the bit rate of the signal from the WiMax transmitter/receiver.

It is another object of the present invention to provide a system for the simultaneous delivery of digital television and interactive broadband service utilizing the same digital broadcast spectrum, wherein the interactive broadband service is delivered by a WiMax transmitter/receiver to broadband communications devices, and signal reflectors are utilized to boost the return signals from the broadband communications devices.

It is another object of the present invention to provide a system for the simultaneous delivery of television signals via digital transmission and interactive broadband service utilization devices (including voice, video and data transfer) utilizing low or high power broadcasting on both a fixed and mobile basis.

It is another object of the present invention to provide a system for the simultaneous delivery of digital television and interactive broadband service utilizing the same digital broadcast spectrum, wherein the interactive broadband service is delivered by a WiMax transmitter/receiver to broadband communications devices utilizing equipment that is compliant with WiMax standards under 802.16d (fixed) or 802.16e (mobile) as well as other delivery technologies, such as 3G, EV-DO and HSDPA.

It is another object of the present invention to provide a system for the simultaneous delivery of digital television and interactive broadband service wherein the digital television signal is converted to an Internet protocol television signal and provided to the interactive broadband service delivery equipment via the Internet such that the Internet protocol signal is integrated with the interactive broadband service signal and is broadcast using the same equipment and bandwidth as is used to deliver the interactive broadband service.

It is another object of the present invention to provide a system for the delivery of interactive broadband service wherein the interactive broadband service is provided at a first node and delivered to communications devices from a second node and wherein the first node and the second node are connected by enabling one or more communications paths as needed from the following group: fiber, cable, fixed wireless, cellular, PCS, WiMax, laser and local exchange carrier telephone network, each of the communications paths utilizing a different communication medium.

It is another object of the present invention to provide a system for the delivery of interactive broadband service by an Internet based service provider having a website for its service users, wherein links refer service users from the service provider's website to other websites and the service provider charges a fee based upon the number of referrals and the gross revenue generated from advertising, the sale of goods or services, or otherwise by the referrals, as reflected by embedded tags identifying the service provider's website as the source of the referrals.

In general, the above noted objectives are achieved by the system of the present invention, as follows.

In accordance with one aspect of the present invention, a method is provided for delivery of digital television and interactive broadband service using the same portion of the digital broadcast spectrum. The method includes broadcasting a digital television signal to a given broadcast area in a first frequency band within a portion of the digital broadcast spectrum and delivering interactive broadband service within at least a portion of the same broadcast area covered by the broadcast digital television signal in a second frequency band within the same portion of the digital broadcast spectrum occupied by the digital television signal, wherein broadcasting a digital television signal and delivering interactive broadband service occur simultaneously.

The step of delivering interactive broadband service includes providing the interactive broadband service using a technology selected from the following: WiMax, 3G, EV-DO or HSPDA.

The step of delivering interactive broadband service includes providing interactive broadband service using multiple sources within the broadcast area covered by the digital television signal. Preferably, the sources are positioned at spaced locations within the broadcast area covered by the digital television signal.

The method further includes providing a communication device capable of receiving interactive broadband service within at least a portion of the broadcast area of the digital television signal and providing the communication device with interference detection technology capable of canceling out the digital television signal or other potentially interfering signals.

The method further includes providing a communication device capable of communication with the source of the interactive broadcast service within a portion of the area covered by the digital television signal, including sending return signals from the communication device to the source of the interactive broadband service, and reflecting the return signals to the source of the interactive broadband service. The step of reflecting includes positioning a plurality of signal reflectors at spaced locations within the area to which the interactive broadband service is delivered by the source. Such signal reflectors may be used to boost return signal power, avoid obstacles such as buildings or mountains located between the communication device and the source or to permit the reduction of the size of the service source transmitter/receivers.

The method further includes using network management signals transmitted at a frequency outside of the portion of the digital broadcast spectrum within which the digital television signal is broadcast and the interactive broadband service is delivered.

The method further includes providing one or more fixed or mobile communications devices within the area covered by the broadcast television signal for communicating with the source of the interactive broadband service.

In accordance with another aspect of the present invention, a method is provided for delivery of digital television and interactive broadband service using the digital broadcast spectrum. The method includes broadcasting a digital television signal to a given broadcast area in a frequency band within one or more licensed portions of the digital broadcast spectrum and delivering interactive broadband service within at least a portion of the same broadcast area covered by the broadcast digital television signal, in a frequency band within an unlicensed portion of the digital broadcast spectrum, wherein broadcasting of the digital television signal and delivering interactive broadcast service occur simultaneously.

The step of delivering interactive broadband services includes providing interactive broadband service using a technology selected from the following: WiMax, 3G, EV-DO or HSPDA.

The step of delivering interactive broadband service includes providing interactive broadband service using multiple sources within the broadcast area covered by the digital television signal. Preferably, the multiple sources are positioned at spaced locations within the broadcast area covered by the digital television signal.

The method further includes providing a communication device capable of receiving the interactive broadband service within a portion of the broadcast area of the digital television signal and providing the communication device with interference detection technology capable of canceling out the digital television signal and other interference, such as adjacent or co-channel interference.

The method further includes providing a device capable of communication with the source of the interactive broadband service within the broadcast area covered by the digital television signal, including sending return signals from the communication device to the source of the interactive broadband service, and reflecting the return signals from the communication device to the source of the interactive broadband service. Preferably, the step of reflecting includes positioning a plurality of signal reflectors at spaced locations within the area to which the interactive broadband service are delivered, including around the periphery thereof.

The method further includes using network management signals transmitted at a frequency outside of the portions of the digital broadcast spectrum, such as the paging frequency, within which the digital television signal is broadcast and the interactive broadband service is delivered.

The method further includes providing one or more fixed or mobile communication devices within the area covered by the broadcast television signal for communicating with the source of the interactive broadband service.

In accordance with another aspect of the present invention, apparatus is provided for delivery of a digital television and interactive broadband service using the same portion of the digital broadcast spectrum. The apparatus includes means for transmitting a digital television signal to a broadcast area in a first frequency band within a portion of the digital broadcast spectrum and means for delivering interactive broadband service within at least a portion of the broadcast area in a second frequency band within that portion of the digital broadcast spectrum, wherein the digital television signal transmitting means and the interactive broadband service delivery means function simultaneously.

The interactive broadband service delivery means includes a transmitter/receiver using a technology selected from the following: WiMax, 3G, EV-DO or HSPDA.

The interactive broadband services delivery means includes more than one transmitter/receiver within the broadcast area.

The interactive broadband service delivery means includes multiple interactive broadband service delivery means positioned at spaced locations within the broadcast area.

The interactive broadband service delivery means includes multiple WiMax transmitter/receivers positioned at spaced locations within the broadcast area.

The apparatus further includes a communication device capable of receiving the interactive broadband service within a portion of the broadcast area. The communication device includes means for canceling the broadcast digital television signal.

The apparatus further includes a device capable of communicating with the interactive broadband service delivery means within a portion of the broadcast area by sending a return signal from the communication device to the interactive broadband service delivery means and means for reflecting the return signal from the communication device to the interactive broadband service delivery means. The return signal reflecting means includes a plurality of signal reflectors positioned at spaced locations around within the area to which the interactive broadcast service is delivered, including around the periphery thereof.

The apparatus further includes means for transmitting network management signals on a frequency outside the portion of the digital broadcast spectrum, such as the paging frequency, utilized for the digital television signal and the interactive broadband service.

The apparatus further includes one or more fixed or mobile communication devices within the broadcast area for communicating with the interactive broadband service delivery means.

In accordance with another aspect of the present invention, apparatus is provided for delivery of digital television and interactive broadband service using the digital broadcast spectrum. The apparatus includes means for transmitting a digital television signal to a broadcast area in a frequency band within one or more licensed portions of the digital broadcast spectrum and means for delivering interactive broadband service within at least a portion of that broadcast area in a frequency band within an unlicensed portion of the digital broadcast spectrum, wherein the digital television signal transmitting means and the interactive broadband service delivery means function simultaneously.

The interactive broadband service delivery means includes a transmitter/receiver using a technology selected from the following: WiMax, 3G, EV-DO or HSPDA.

The interactive broadband service delivery means includes more than one transmitter/receiver within the broadcast area.

The interactive broadband service delivery means includes multiple interactive broadband service delivery means located at spaced positions within the broadcast area.

The interactive broadband service delivery means includes multiple WiMax transmitter/receivers located at spaced positions within the broadcast area.

The apparatus further includes a communication device capable of receiving the interactive broadband services within a portion of the broadcast area. That device includes means for canceling the broadcast digital television signal or other interference.

The apparatus further includes a device capable of communicating with the interactive broadband service delivery means within a portion of the broadcast area by sending a return signal from the communication device to the interactive broadband service delivery means and means for reflecting the return signal from the communication device to the interactive broadband service delivery means. The return signal reflecting means includes a plurality of signal reflectors positioned at spaced locations within the area to which the interactive broadcast service is delivered, including around the periphery thereof.

The apparatus further includes means for transmitting network management signals on a frequency outside the portion of the digital broadcast spectrum, such as the paging frequency, utilized by the digital television signal transmitting means and interactive broadband service delivery means.

The apparatus further includes one or more fixed or mobile communication devices within the broadcast area for communicating with the interactive broadband service delivery means.

In accordance with another aspect of the present invention, a method is provided for delivery of digital television and interactive broadband service using the same portion of the digital broadcast spectrum. The method includes the steps of: broadcasting a digital television signal to a given broadcast area within a portion of the digital broadcast spectrum and delivering interactive broadband service within at least a portion of the same broadcast area covered by the broadcast digital television signal in the same portion of the digital broadcast spectrum occupied by the digital television signal, wherein the step of broadcasting a digital television signal and the step of delivering interactive broadband service occur simultaneously.

The step of broadcasting a digital television signal includes the step of converting the digital television signal into an Internet protocol television signal and the step of broadcasting the Internet protocol television signal using the same equipment as is used to deliver the interactive broadband service.

The method further includes the step of using the Internet to provide the Internet protocol television signal to the equipment used to deliver the interactive broadband signal service.

In accordance with another aspect of the present invention, a method is provided for delivery of digital television and interactive broadband service using the same portion of the digital broadcast spectrum. The method includes the steps of: delivering a digital television signal to a given broadcast area within a portion of the digital broadcast spectrum and delivering interactive broadband service within at least a portion of the same broadcast area covered by the broadcast digital television signal in the same portion of the digital broadcast spectrum occupied by the digital television signal, wherein the step of delivering a digital television signal and the step of delivering interactive broadband service utilize the same delivery equipment.

The step of delivering a digital television signal includes the step of converting the digital television signal into an Internet protocol television signal and the step of using the Internet to provide the Internet protocol television signal to the delivery equipment.

In accordance with another aspect of the present invention, apparatus is provided for delivery of digital television and interactive broadband service using the same portion of the digital broadcast spectrum. The apparatus includes: means for broadcasting a digital television signal to a given broadcast area within a portion of the digital broadcast spectrum and means for delivering interactive broadband service within at least a portion of the same broadcast area covered by the broadcast digital television signal in the same portion of the digital broadcast spectrum as is occupied by the digital television signal. The means for delivering interactive broadband service includes the means for broadcasting a digital television signal.

The means for broadcasting a digital television signal includes means for converting the digital television signal into an Internet protocol television signal and means for broadcasting the Internet protocol television signal using the means for delivering the interactive broadband service.

The apparatus further includes means for using the Internet to provide the Internet protocol television signal to the means for delivering the interactive broadband signal service.

In accordance with another aspect of the present invention, apparatus is provided for delivery of digital television and interactive broadband service using the same portion of the digital broadcast spectrum The apparatus includes: means for delivering a digital television signal to a given broadcast area within a portion of the digital broadcast spectrum and means for delivering interactive broadband service within at least a portion of the same broadcast area as is covered by the broadcast digital television signal in the same portion of the digital broadcast spectrum occupied by the digital television signal. The digital television signal is delivered by the means for delivering interactive broadband service.

The means for delivering a digital television signal includes means for converting the digital television signal into an Internet protocol television signal and means for using the Internet to provide the Internet protocol television signal to the interactive broadband service delivery means.

In accordance with another aspect of the present invention, a method is provided for delivery of interactive broadband service. The method includes the steps of: providing interactive broadband service at a first node, delivering the interactive broadband service to communications devices from a second node and connecting the first node and the second node. The step of connecting the first node and the second node includes enabling one or more communications paths from the following group: fiber, cable, fixed wireless, cellular, PCS, WiMax, laser and local exchange carrier telephone network. Preferably, each of the communications paths utilizes a different communication medium.

In accordance with another aspect of the present invention, apparatus is provided for delivery of interactive broadband service. The apparatus includes means for providing interactive broadband service at a first node, means for delivering the interactive broadband service to communications devices from a second node, and means for connecting the first node and the second node. The means for connecting the first node and the second node include means for enabling one or more types of communications paths from the following group: fiber, cable, fixed wireless, cellular, PCS, WiMax, laser and local exchange carrier telephone network. Preferably, each of the communication paths utilizes a different communications medium.

In accordance with another aspect of the present invention, a method is provided for delivery of interactive broadband service by an Internet based service provider. The method includes the steps of: providing interactive broadband service to service user's communications devices, providing a website for service users, providing links to refer service users from the service provider's website to the websites of others and charging a fee based upon the number of referrals and/or the gross revenues generated from advertising, the sale of goods and services or otherwise by the referrals.

Preferably, the links to advertiser's websites include an embedded tag identifying the service provider's website as the source of the referral.

In accordance with another aspect of the present invention, apparatus is provided for delivery of interactive broadband service by an Internet based service provider. The apparatus includes means for providing interactive broadband service to service user's communications devices, means for providing a website for its service users, means for providing links to refer service users from the service provider's website to other websites and means for charging a fee based upon the number of referrals and/or the gross revenues generated from advertising, the sale of goods and services or otherwise by the referrals.

Preferably, means are provided for embedding a tag identifying the service provider's website as the source of the referral.

In accordance with another aspect of the present invention, a method is provided for delivery of interactive broadband service. The method includes the steps of: providing interactive broadband service, delivering the interactive broadband service to communications devices using interactive broadband service delivery equipment, providing the interactive broadband service to the interactive broadband service delivery equipment via the Internet using a local exchange carrier telephone network operated by a telephone company having a central office and locating the interactive broadband service delivery equipment proximate the central office of the telephone company.

In accordance with another aspect of the present invention, apparatus is provided for delivery of interactive broadband service. The apparatus includes: means for providing interactive broadband service, means for delivering the interactive broadband service to communications devices using interactive broadband service delivery equipment, means for providing the interactive broadband service to the interactive broadband service delivery equipment via the Internet using a local exchange carrier telephone network operated by a telephone company having a central office, wherein the interactive broadband service delivery equipment is located proximate the central office of the telephone company operating the local exchange carrier telephone network.

BRIEF DESCRIPTION OF THE SEVERAL VIEWS OF DRAWINGS

To these and to such other objects that may hereinafter appear, the present invention relates to a system for the simultaneous delivery of digital television and interactive broadband service as described in detail in the following specification and recited in the annexed claims, taken together with the accompanying drawings, in which like numerals refer to like parts and in which:

Figure 5:
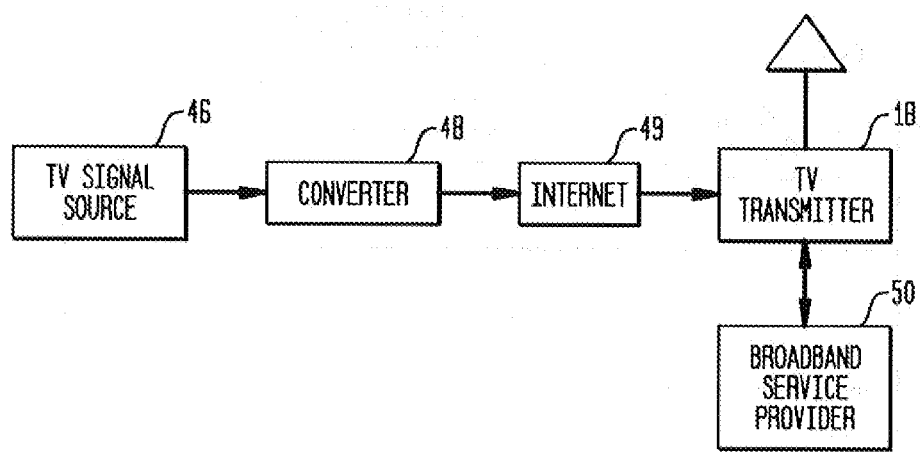

FIG. 5 is a block diagram illustrating the Internet delivery of television signals to the interactive broadband service delivery transmitter/receiver such that the signals can be time integrated for delivery by the same equipment as the interactive broadband service, within the same bandwidth; and FIG. 6 is a diagram illustrating the various communications paths available for connecting the Internet to the interactive broadband service delivery transmitter/receiver.

DETAILED DESCRIPTION OF THE INVENTION

The present invention is a method and apparatus for simultaneous broadcast of digital television and delivery of interactive broadband service. The interactive broadband service may include any two-way voice, video and/or data communication. The system advantageously utilizes the unused or "white space" portions of the digital broadcast spectrum to deliver the interactive broadband service in order to maximize the use of this limited spectrum resource. The result of this simultaneous delivery system is to provide the most efficient and effective way to deliver such services.

Three preferred embodiments of the present invention are disclosed. The first two preferred embodiments utilize the same method and apparatus. The difference lies in the frequencies over which the interactive broadband service is delivered. The difference between the two preferred embodiments is illustrated with reference to FIG. 3.

In the third preferred embodiment of the present invention, as described below with reference to FIG. 5, the digital television signal is not broadcast separately from the interactive broadband service but instead by the same equipment as is used to deliver the interactive broadband service and within the same portion of the digital broadcast spectrum as the interactive broadband service. In that embodiment, the digital television signal is converted to an Internet protocol television signal and provided through the Internet to the interactive broadband service delivery equipment. The Internet protocol television signal is then time integrated with the interactive broadband service signal such that it can be delivered using the same equipment as is used to deliver the interactive broadband service, over the same portion of the digital broadcast spectrum.

Figure 3:
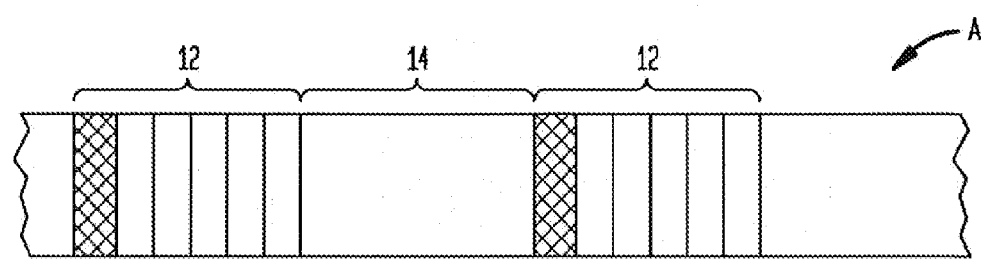
FIG. 3 illustrates the digital broadcast spectrum showing a typical the frequency allotment in accordance with the first and second preferred embodiments of the present invention.

FIG. 3 is a graphic representation of a portion of the digital broadcast spectrum, generally designated A, which is divided into two F.C.C. licensed portions 10, 12, each, for example, 6 MHz wide, separated by an unlicensed and thus unused "white space" 14. For purposes of illustration, each of the licensed portions 10, 12 is subdivided into six sections, each section representing a part, for example, 1 MHz wide frequency band, of the licensed portion.

Transmission of a digital television signal only requires only a narrow bandwidth, for example, 1 MHz band. Accordingly, the first subdivision of each licensed portion 10, 12 of spectrum A is shown as allocated for the broadcast of a digital television signal, as denoted by the crosshatching. The remaining five subdivisions of each licensed portion 10, 12, each representing, for example, a band 1 MHz wide, are not required for the transmission of digital television signal. In the first preferred embodiment of the present invention, those unused frequencies within the licensed bandwidth are utilized for the delivery of the interactive broadband service.

Thus, in the first preferred embodiment of the present invention, both the digital television signal and the interactive broadband service are simultaneously delivered at different frequencies within the same licensed portion of the digital broadcast spectrum, for example is 6 MHz wide.

In the second preferred embodiment, instead of utilizing the unused space within the licensed portions 10, 12 of spectrum A to deliver the interactive broadband service, an unlicensed portion 14 of spectrum A that lies outside (in the example illustrated, between) the licensed portions 10, 12 is utilized to deliver the interactive broadband service.

Figure 2:
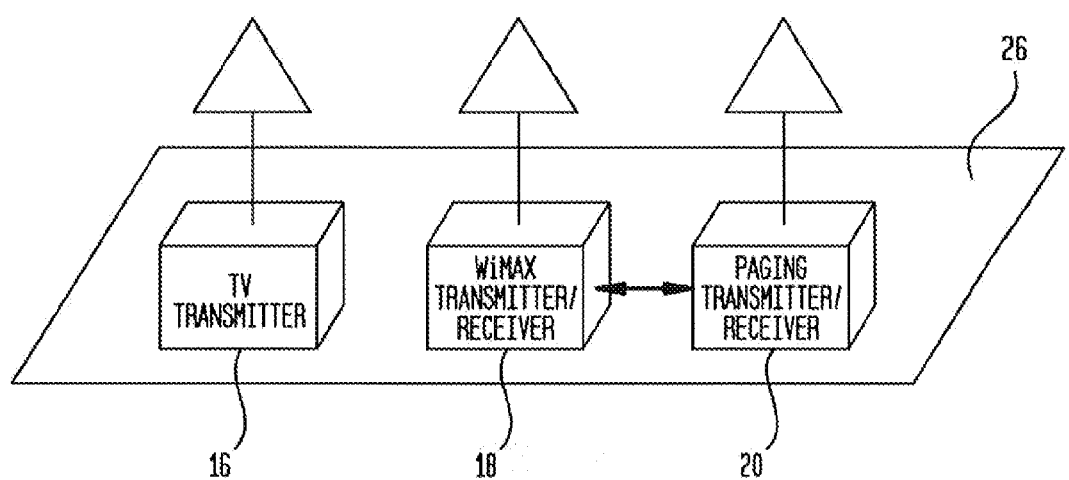
FIG. 2 illustrates the digital television transmitter, interactive broadband service transmitter/receiver and network management signal transmitter/receiver of the present invention.

As seen in FIG. 2, the system of the present invention utilizes a conventional digital television transmitter 16. It also utilizes multiple interactive broadband service delivery means, each preferably including an interactive broadband service delivery transmitter/receiver, such as a conventional WiMax compliant software defined transmitter/receiver 18. Preferably, a network management signal transmitter/receiver, such as a conventional paging service transmitter/receiver 20, is coupled to each WiMax transmitter/receiver 18.

Figure 1:
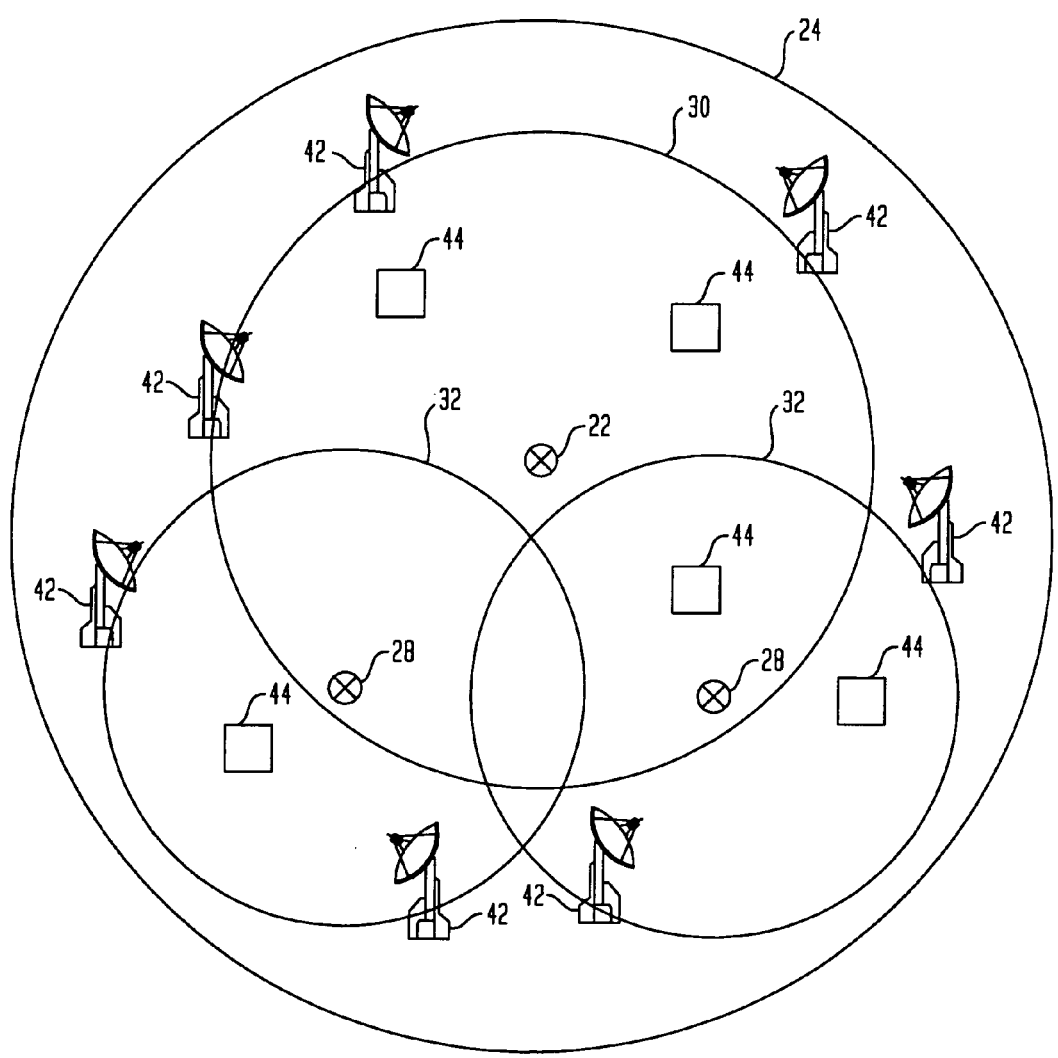
FIG. 1 is a layout diagram of the system of the present invention.

As illustrated in FIG. 1, all three components are located at one central location 22 within a geographical area 24, which represents the broadcast coverage area for the digital television signal from transmitter 16. The separate antennae for each of the components are preferably located as high above the ground as is possible, for example on a rooftop or tower 26.

At other locations 28 within broadcast area 24, remote from central location 22, an interactive broadband service delivery transmitter/receiver 18 and a network management signal transmitter/receiver 20 connected to that interactive broadband service delivery transmitter/receiver 18 are located, again as high as possible above the ground, for example, on a tower. Although only two remote equipment locations 28 are illustrated on FIG. 1 for simplicity, it should be understood that as many remote equipment locations as are necessary to provide delivery of interactive broadband service throughout broadcast area 24 may be provided.

The WiMax transmitter/receiver 18 at central location 22 delivers interactive broadband service within the geographical area denoted 30 of area 24. The network management signal transmitter/receiver 20 connected to that WiMax transmitter/receiver delivers network management signals to the same geographical area 30 of area 24.

The WiMax transmitter/receiver 18 situated at each remote location 28 within broadcast area 24 delivers the interactive broadband service within the geographical area denoted as 32 surrounding that location. The network management signal transmitter/receiver 20 connected to that WiMax transmitter/receiver delivers network management signals within the geographical area 32 of area 24 covered by that WiMax transmitter/receiver. The size of the areas 30 and 32 depends upon the strength of the transmitter/receivers, which may be adjusted by changing power levels, using additional antennas, etc. Further, the delivery areas may overlap, as illustrated.

Transmitter 16 may be any conventional digital television transmitter such as Product Number DVB-T-V/7.5 IOT/7.5 kw with TH 760 I.O.T. used with a matching antenna. Transmitter/receivers 18 may be any conventional WiMax compliant software defined transmitter/receiver, such as one from Alvarion-BreezeMAX Macro Base Station, tuned to the desired frequency and used with a matching antenna.

However, equipment that operates using other technologies may be employed instead of a WiMax transmitter/receiver. For example, conventional EV-DO transmitter/receivers, such as Product IP-RN 8000 from Airvana, or 3G and HSPDA transmitter/receivers, such as Product 3G-n macro or mini transmitter/receivers from Motorola Horizon, may be employed instead of WiMax transmitter/receivers.

Transmitter/receiver 20 may be any conventional paging signal transmitter/receiver. For example, a TTI Wireless Paging Transmitter/receiver available from Turn-Key Technologies, Inc may be employed for this purpose.

Because the strength of the digital television signal or other interference, such as adjacent or co-channel interference, may be much greater than the strength of the interactive broadband service delivery signal within broadcast area 24, the digital television signal or other signals may tend to interfere with the reception of the interactive broadband service delivery signal by the fixed or mobile communications devices 44 that interact with the interactive broadband service delivery transmitter/receivers 18. Accordingly, it is preferable to equip those communications devices with interference detection circuitry in the chip set. Such interference detection circuitry is commercially available and typically functions as depicted in FIG. 4.

Figure 4:
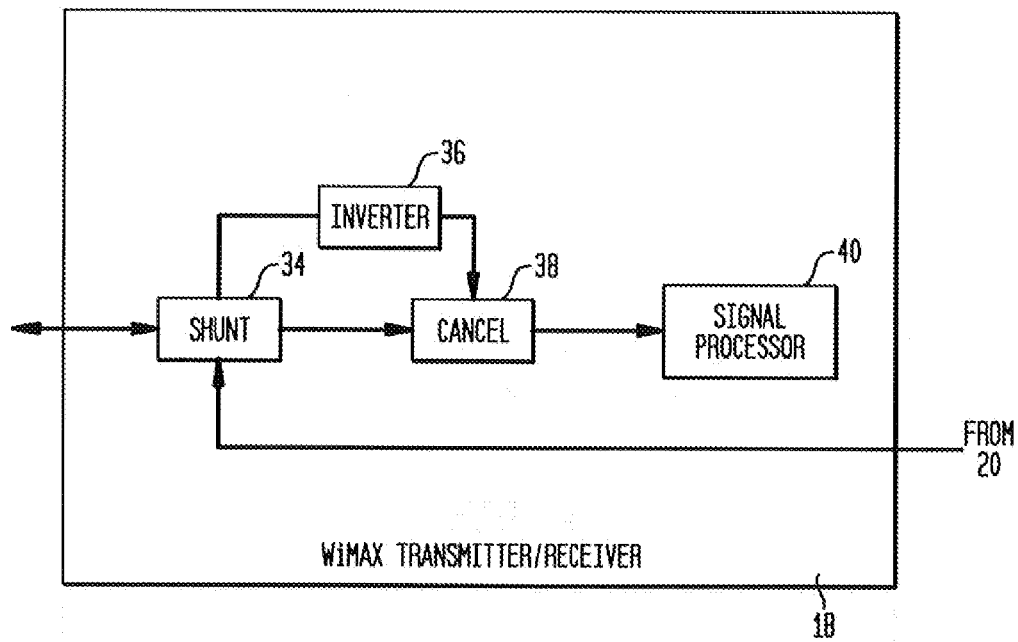
FIG. 4 is a block diagram of the interference detection circuitry in a typical interactive broadband service communication device of the present invention.

FIG. 4 shows a function block diagram of the interference detection section of a typical transmitter/receiver 18. The received signal, which includes a combination of the high power digital television signal or other interfering signals, and the lower power interactive broadband service delivery signal, is provided to the input/output circuit 34 of the transmitter/receiver 18. Circuit 34 shunts a portion of the received digital television signal or other interfering signal to a signal inverter circuit 36. Circuit 34 passes the remainder of the combined signal to a cancellation circuit 38. The inverted digital signal from circuit 36 is transferred to cancellation 38 where it cancels the remaining portion of the digital television signal or other interfering in the combined signal, leaving only the interactive broadband service delivery signal for further processing by circuit 40.

Again referring to FIG. 1, a number of signal reflectors 42 may be utilized to maximize the strength of the return signals from the various fixed and mobile interactive broadband service communication devices 44 within area 24 back to the broadband service provider. The signal reflectors 42 may be strategically placed at the various distances from the locations of the interactive broadband service delivery transmitter/receivers 18 to boost the return signal from the communications devices. These reflectors would be placed at a variety of locations as needed within the range of the interactive broadband service delivery transmitter/receiver, including the periphery of the interactive broadband service delivery transmitter/receiver range or at the periphery of the licensed territory, depending on whether the transmission approach taken in an area is single transmission or cellular.

Signal reflectors 42 may be used to boost the return signal power from the communication devices 44 back to the interactive broadband service delivery transmitter/receiver, avoid obstacles such as buildings or mountains located between the communication devices 44 and the interactive broadband service signal delivery transmitter/receiver 18 or to permit the reduction of the size of the transmitter/receivers 18.

The factors to be taken into account in positioning reflectors 42 include: (a) the demand within the interactive broadband service delivery transmitter/receiver range (greater demand generally requires more reflectors); (b) the output power level of the interactive broadband service delivery transmitter/receiver and other transmitters with the same area covered by the interactive broadband service delivery transmitter/receiver (greater power and more additional transmitters generally require more reflectors); (c) the geography of the terrain within the interactive broadband service delivery transmitter/receiver range (more variability in terrain generally requires more reflectors); (d) the height and proximity to each other of buildings within the area covered by the interactive broadband service delivery transmitter/receiver (a greater number of buildings and taller buildings generally require more reflectors); (e) the size of the area covered by the interactive broadband service delivery transmitter/receiver (larger coverage area generally requires more reflectors); (f) the distance between interactive broadband service delivery transmitter/receivers (greater the distance generally requires more reflectors); and (g) the desired speed of the interactive broadband service, especially the uplink speed (faster uplink speed generally requires more reflectors).

The reflectors may be any conventional signal reflector, such as the antenna reflectors available from Rohde & Schwarz. Different size reflectors with optimum feeds may be selected as needed.

Interactive broadband service delivery transmitter/receivers 18 can deliver service to a variety of types of interactive broadband service communications devices 44. Such devices may include fixed devices, such as home/office communications and computing equipment or mobile devices such as PDA's, cellular phones or hand-held computers.

For some communications devices 44, such as hand-held computers, it may be preferable to use a lower bit rate return signal than the signal transmitted by the interactive broadband service delivery transmitter/receiver 18 to the communications device 44. For example, the transmitted signal from transmitter/receiver 18 may utilize a bit rate of 1.5 mbs and the return signal from the device 44 may utilize a bit rate of 800 kbs.

FIG. 5 illustrates the third preferred embodiment of the present invention. In this embodiment, delivery of digital television and interactive broadband service is accomplished using the same portion of the digital broadcast spectrum and the same delivery equipment. The digital television signal is delivered to broadcast area 24 within a portion of the digital broadcast spectrum. The interactive broadband service is delivered within at least a portion of the same broadcast area 24 covered by the broadcast digital television signal in the same portion of the digital broadcast spectrum occupied by the digital television signal. The broadcasting a digital television signal and the delivery of the interactive broadband service occur simultaneously.

In this embodiment, the digital television signal is first converted into an Internet protocol television signal. The Internet is used to provide the Internet protocol television signal to the equipment that is used to deliver the interactive broadband signal service. Thus, in this embodiment, the separate digital television signal transmitter 16 is eliminated.

As is illustrated in FIG. 5, the digital television originates with a digital television signal source 46. Source 46 is connected to a converter 48 which converts the digital television signal from source 46 into an Internet protocol television signal. The Internet protocol television signal is then provided via the Internet 49 to the interactive broadband transmitter/receiver 18.

Transmitter/receiver 18 takes the Internet protocol television signal and integrates that signal with the interactive broadband service signal from the service provider 50. That integrated signal is delivered by transmitter/receiver 18. Accordingly, both the digital television signal and the interactive broadband service signal are broadcast in the same broadcast area, using the same transmitter/receiver 18, within the same portion of the digital broadcast spectrum.

FIG. 6 illustrates another aspect of the present invention having to do with the means for connecting the interactive broadband service provider 50, which in an Internet based system typically provides the service via the Internet to the interactive broadband service delivery means, such as transmitter/receiver 18, via an existing fiber network or local exchange carrier telephone network (LEC) 52. Accordingly, a means of connecting the Internet to the interactive broadband service delivery means is required.

In the present invention, that connecting means consists of multiple possible connection paths using different connection technologies. The Internet carrying fiber network or LEC 52 is connected to a connector/selector circuit 54 which is used to enable one of a number of possible connection paths to provide two-way broadband service communications with the broadband service delivery transmitter/receiver 18. The connection paths may employ a variety of different technologies including one or more of the following: cable 56; fiber 58; a light connection between lasers 60; cellular, PCS or WiMax transmitters/receivers 62; or fixed wireless transmitters/receivers 64, the latter preferably operating in the 5 to 90 Gigahertz range. The other ends of those connections are connected to a second connector/selector circuit 66 which enables the same connection path as connector/selector circuit 54 and is, in turn, connected to transmitter/receiver 18.

Obviously, not all of the different types of communication path identified above will be available on all systems. Further, the connector/selector circuits can be used to enable communication paths as is required at a particular time, or during a defined time period. On the other hand, the selection may be determined ahead of time to enable a particular communication path or hierarchy of communication paths.

Which particular communication path is enabled at a particular time depends upon a number of different factors. Those factors include: the amount of demand for the broadband service in the coverage area of the service delivery transmitter/receiver; the distance between the fiber network or LEC and the service delivery transmitter/receiver; cost of building and operating the connection path; the quality of the service required to be delivered in the area covered by the service delivery transmitter/receiver; the availability of the various connection paths at a particular time (for example, if the cable connection is being used to capacity, a second choice, such as fixed wireless, may be selected); the topography of the coverage area of the service delivery transmitter/receiver; and the need for redundant communication paths.

Alternatively, with respect to signal distribution from the broadband service provider through a local exchange carrier telephone network, the problem of connecting the service delivery transmitter/receiver 18 with the service provider can sometimes be solved by eliminating the various connections altogether and placing the service delivery transmitter/receivers 18 at locations proximate the central offices of the telephone company providing the local exchange carrier telephone network by which the broadband service is provided. In many cases, those telephone company central offices may be widely dispersed, thereby providing a wide broadband service coverage area.

The interactive broadband service provided by the present invention may be paid for by the user through monthly subscription fees, as is customary for such services. However, since it is contemplated that the system of the present invention will be Internet based, the service provider will operate a website for its service users with a home page that is used by its service users to access all other Internet sites.

The service provider's home page will link to other websites, as is common. When a service user goes from the service provider's website to another website, an embedded "tag" is sent to the other website along with the user connection, signifying that the service provider's website is the source of the referral. That "tag" will follow the service user where ever the service user goes on the Internet during that session.

The other website operators pay a fee to the service provider for the referral of the service user from the service provider's website. That fee may based upon advertising, sales leads, and/or commissions for the sale of goods and services to the referred service users, either on a periodic (monthly) basis or based on the number of customer referrals to the other website from the service provider's website, as represented by the embedded "tags", or both. Ultimately, it may be the object of the service provider to obtain sufficient funds from such fees to provide the interactive broadband service to service users for a greatly reduced fee or even no fee.

It will now be appreciated that the present invention relates to a system for simultaneously delivering television via digital transmission and interactive broadband service (including two-way voice, video and data communications) utilizing low or high power broadcasting on both a fixed and mobile basis.

The system operator subdivides each channel of television spectrum (which is licensed by the FCC in 6 MHz blocks) into a first channel consisting of a small part (for example, 1 MHz of the licensed bandwidth) for the delivery of digital television utilizing conventional digital television signal transmitting equipment and a second channel consisting of the remaining part (for example, 5 MHz) of spectrum for the delivery of broadband communications service. The broadband service is preferably delivered utilizing equipment that is compliant with WiMax standards under 802.16d (fixed) or 802.16e (mobile).

Other delivery technologies, in addition to WiMax, such as 3G, EV-DO and HSPDA could be utilized in the portion of the band not allocated to digital television, to deliver the broadband service. Further, the WiMax, 3G, EV-DO or HSPDA transmitter/receiver equipment could be used, either alone or integrated with an existing cellular, PCS or other providers of such services utilizing the broadcast spectrum alone or with that spectrum integrated with other broadcast or other spectra to deliver such services.

The delivery of the digital television signal or the interactive broadband service signals or both can be cellularized in order to maximize signal strengths for the end user, minimize interference from each signal and allow for the greatest frequency reuse. Where appropriate, a single transmitter for each signal situated within the covered area can be utilized when the likely demand for such services would not justify the costs of cellularization.

Software defined "WiMax certified" or "pre-WiMax" transmitter/receivers are preferably used to deliver the interactive broadband service. Those devices would be capable of providing such services over the entire 480-698 MHz band, including the "white spaces", but would initially utilize only proprietary licensed spectrum, as in the first preferred embodiment of the present invention. Once the "white space" issues are resolved by the FCC, the software defined transmitter/receivers could easily be reset to use all of the available "white space" in a particular broadcast area, as set forth in the second preferred embodiment of the present invention, in addition to the bandwidth of the proprietary licensed spectrum. This would allow the licensed system operator access to a larger amount of spectrum with lower capital costs.

The above approaches can be used for both full power and low power television spectrum grants. For some low power applications, system operators may increase the amount of power beyond that necessary to deliver television in order to reach the full contour of the low power license with broadband services.

Further, digital television signals could be delivered utilizing Internet protocol as the delivery mechanism for television, thereby increasing the flexibility of use of the spectrum being used and further increasing the amount of broadband services that could be delivered in the amount of spectrum that is available where demand is likely to be greater.

A variety of issues can be addressed by utilizing approaches similar to those taken by cellular providers using other spectrum. For example, interference that might result in certain cases from the power differential between the television signal and the broadband signal could be eliminated by utilizing existing interference detection technology described above that would detect the strongest signal at a device and inject that signal into the receiving device to cancel it out. Adjacent and co-channel signal interference issues would be dealt with via a combination of the above techniques. In addition, a lower bit rate return link referred to previously can be utilized to enable lower power devices to send data back to the originating point which would also enhance the reliability of the above described systems.

The above described approach can be utilized to deliver broadband services in connection with incumbent local exchange carrier's network facilities. The cell sites for the deployment of any of these networks could be co-located with incumbent local exchange carrier's central office facilities, thereby allowing the use of the incumbent local exchange carrier's fiber and other interconnection capacity. This would save on the cost of interconnection for the wireless broadband provider, while also allowing the incumbent local exchange carriers to add broadband capacity to their product offering and network at a lower cost than the alternatives, in most cases. That would be especially true for rural local exchange carriers. This approach to networking would not be limited to digital broadcast spectrum only. Any mobile spectrum could be used in this way.

Alternatively, cell sites could be interconnected using a combination of LEC facilities, cable, cellular, WiMax, PCS, laser, fiber and fixed wireless facilities. The above described system could be used for the interconnection of cell sites to provide backhaul connections to PCS, cellular and other wireless service providers in addition to the other services that could be provided in the previously described system.

A more flexible approach to the breakdown of the spectrum could be undertaken to allow for the delivery of any number of television channels (up to capacity of the a licensed portion of the spectrum, which is currently 6 MHz) with the unused portion of the spectrum used to deliver broadband services. From 1 to 5 channels could be utilized with the balance being used for broadband. Streaming, broadcasting and Internet protocol delivery could be used to deliver services in separated parts of the spectrum simultaneously. The spectrum could be subdivided using any of these three delivery methods to deliver services in these separate parts.

In order to provide cost effective network management, paging and/or other similar frequencies are used to provide network management services in lieu of using a portion of any spectrum being used to deliver the broadband services, thereby maximizing the use of the spectrum used to deliver such services to end users. The present invention can also be used by other wireless carriers using other types of spectrum. The paging spectrum would be used as phone lines are used today to monitor equipment performance at each interactive broadband service transmitter/receiver site and to send information back to a network management center in response to commands delivered to the cell sites. In some cases repairs would be made remotely over the paging network as well.

Broadband communications services that would be offered over the network of the present invention, such as two-way voice, data and/or video communications, could be billed to the end user on a single bill, along with other services such a PCS, cellular services, cable television, telephone services etc. or alone.

Alternatively, those services could be offered at low or no cost to the service user and paid for by sharing advertising and/or other revenues with the operators of other websites accessed by the service user from the service provider's website. The service provider would develop a website for use as the portal by its service users accessing the Internet over the service provider's network or other systems. The service users would then search the web from the network by first arriving at the service provider's portal, which would be credited for a portion of the advertising or other revenue generated by the service users' subsequent web activities.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

I claim:

1. A method for delivering, receiving and/or broadcasting video, voice and data service to one or more remotely located end user wireless communications devices using a portion of a pre-existing local exchange carrier telephone network operated by a telephone company having a central office to connect the service provider and a transmitter/receiver, the method comprising the steps of:
   (a) providing the service of delivering, receiving and/or broadcasting video, voice and data to one or more remotely located end user wireless communications devices;
   (b) connecting the service provider and the telephone network to provide a two-way communications link between the service provider and the telephone network;
   (c) connecting the telephone network to the transmitter/receiver to provide a two-way communications link between the telephone network and the transmitter/receiver; and
   (d) wirelessly delivering, receiving and/or broadcasting the video, voice and data service to and from remotely located end user wireless communications devices using the transmitter/receiver.

2. The method of claim 1 wherein the pre-existing local exchange carrier telephone network is connected to other communications devices by means other than the transmitter/receiver and wherein video, voice and data service is delivered to the other communications devices from the telephone network using the other delivery means.

3. The method of claim 1 wherein the step of connecting the telephone network to the transmitter/receiver to provide a communications link between the telephone network and the transmitter/receiver comprises the step of providing multiple connection paths between the telephone network and the transmitter/receiver and the step of selecting one of the connecting paths.

4. The method of claim 3 wherein the connection paths provided include one or more of the following technologies: cable, fiber, laser, cellular, PCS, WiMax and wireless.

5. The method of claim 3 wherein the step of selecting one of the connecting paths comprises the steps of connecting the telephone network to one end of the selected communications path and the step of connecting the other end of the selected communication path to the transmitter/receiver.

6. The method of claim 1 further comprising the step of locating the transmitter/receiver proximate the central office switch of the telephone company.

7. The method of claim 1 further comprising the step of locating the transmitter/receiver on top of the central office of the telephone company.

8. The method of claim 1 wherein first and second transmitter/receivers are used to wirelessly deliver, receive and/or broadcast video, voice and data to and from remotely located end user communications devices, wherein the telephone company has more than one central office and wherein the first and second transmitter/receivers are located proximate different central offices.

* * * * *